March 26, 1968 K. BRILL 3,375,413
ELECTROLYTIC CAPACITOR COMPRISING FILM-FORMING
METAL SHEET CARRYING A DIELECTRIC OXIDE FILM
AND A METAL DIOXIDE ELECTROLYTE LAYER
Filed June 8, 1965 2 Sheets-Sheet 1
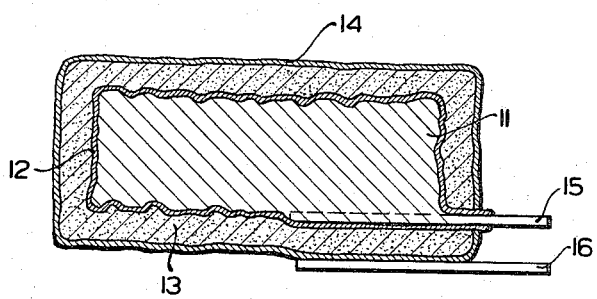
FIG.1
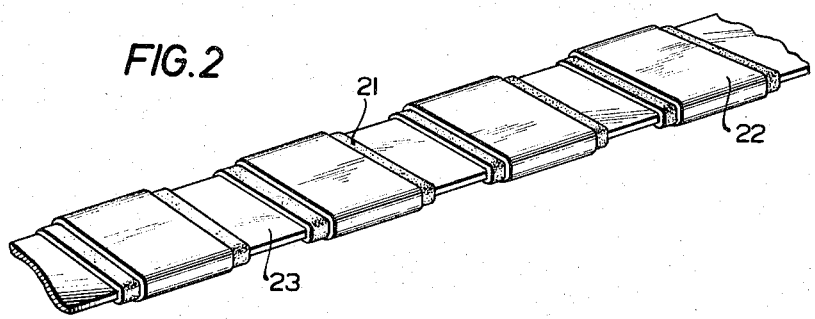
FIG.2
FIG.3
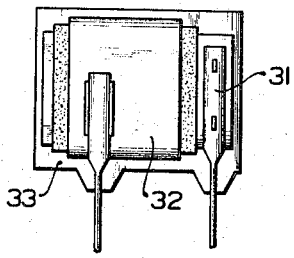
FIG.4
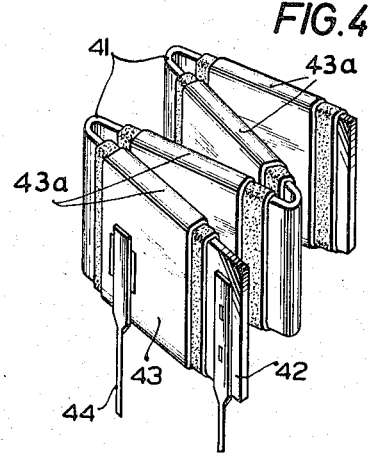
INVENTOR
Klaus Brill
by
Michael J. Striker

United States Patent Office 3,375,413
Patented Mar. 26, 1968

3,375,413
ELECTROLYTIC CAPACITOR COMPRISING FILM-FORMING METAL SHEET CARRYING A DIELECTRIC OXIDE FILM AND A METAL DIOXIDE ELECTROLYTE LAYER
Klaus Brill, Stuttgart, Germany, assignor to Robert Bosch GmbH., Stuttgart, Germany
Filed June 8, 1965, Ser. No. 462,248
Claims priority, application Germany, June 12, 1964, B 77,221
17 Claims. (Cl. 317—230)

ABSTRACT OF THE DISCLOSURE

A dry electrolytic capacitor having an anode of film-forming metal including a dielectric oxide film thereon and a pyrolytically reducible oxide layer on the film is produced by heating said anode and dielectric film to a temperature within the range of 100-450° C., and spray depositing, on the thus heated dielectric film, a finely divided liquid solution of a metal salt pyrolytically decomposable, at the temperature of said heating, to a pyrolytically reducible oxide for in situ producing a homogeneous electrolyte-reducible oxide layer on said dielectric film.

---

The present invention relates to dry electrolytic capacitors and to a method of making the same.

More particularly, the present invention is concerned with a method for producing dry electrolytic capacitors which comprise an anode consisting of a film-forming metal on which it is possible to form a dielectric film, for instance by anodic oxidation. Such metals include aluminum and tantalum, however, other metals such as magnesium, titanium, niobium, zirconium and zinc are also film forming metals so that, if desired, the anode may also be formed of film-forming metals other than aluminum and tantalum. A dielectric cover layer, for instance formed by anodic oxidation, is provided on the anode, and superposed thereon is the solid electrolyte which, for instance, may consist of a layer of manganese dioxide.

The use of solid (dry) electrolytes in electrolytic capacitors has several advantages, particularly with respect to the temperature dependency of the electric characteristics of the capacitors. The capacity as well as the power factor or loss angle of dry electrolytic capacitors are much less temperature dependent within the temperature range of between −80° C. and +100° C. than is the case with respect to liquid electrolyte capacitors.

However, the production of dry electrolyte capacitors is connected with great difficulties since, on the one hand, because of the limited self-healing characterisitcs of solid electrolyte, very high demands must be made with respect to the quality of the dielectric oxide layer while, on the other hand, the dielectric oxide layer is severely attacked during the formation of the semiconductive electrolyte layer in accordance with conventional methods of producing the manganese dioxide layer by pyrolytic decomposition of magnese nitrate or the like.

For instance, according to one method, the unidirectionally conductive metal, for instance a formed aluminum foil, which is to be covered with a layer of the semi-conductive electrolyte, is immersed into liquid manganese nitrate and subsequently heated to the pyrolysis temperature of between 300° and 400° C., at which temperature the manganese nitrate is converted into manganese dioxide. The forming of the anode and the immersion into liquid manganese nitrate and subsequent pyrolysis are repeated several times, and the thus formed manganese dioxide layer is then finally covered with a metallic, conductive cover layer to which a cathode terminal or connecting wire is then attached. The substantial gas development during the pyrolysis will result in the formation of a highly porous manganese dioxide layer having a rough surface. It has also been found that reaction products of the pyrolysis, for instance nitric acid formed of nitrogen oxide and water, will attack the aluminum oxide layer so that in spite of several repetitions of the formation and pyrolysis processes it is not possible to obtain the desired small residual currents and loss angles.

It has also been proposed to avoid strong gas formation during the pyrolysis by very slowly heating to pyrolysis temperature so that the manganese nitrate layer is dried prior to start of the pyrolysis. This last mentioned method is carried out by winding about each other a formed aluminum foil, a strip of glass fabric and an unformed foil as counter electrode, and by then impregnating the thus-formed structure in a partial vacuum with manganese nitrate solution. Thereafter, by slow drying at subatmospheric pressure and gradually rising temperatures up the pyrolysis temperature, heating is carried out in such a manner that the boiling temperature of the solvent is reached only after evaporation of the same. This very time-consuming heat treatment is carried out at least twice. Due to the necessity of using the glass fabric as a spacing element between the electrodes and due to the use of an unformed foil as the counter electrode, the size or spatial requirements of the dry electrolyte capacitor are increased in a most undesirable manner.

It is therefore an object of the present invention to provide a method for producing dry electrolytic capacitors which will overcome the above discussed difficulties and disadvantages.

It is another object of the present invention to provide a dry electrolytic capacitor of very small spatial requirements, smooth surfaces of the various layers, particularly the manganese dioxide layer, and low residual currents and loss angles.

It is yet a further object of the present invention to provide a method of producing a dry electrolytic capacitor of the above described characteristics, which method can be carried out in a particularly simple and economical manner.

Other objects and advantages of the present invention will become apparent from a further reading of the description and of the appended claims.

With the above and other objects in view, the present invention contemplates in a method of producing a dry electrolytic capacitor, the steps of heating an anode consisting essentially of a film-forming metal and a dielectric film thereon to a predetermined elevated temperature being below the melting point of the metal, and directing a finely subdivided liquid spray against the dielectric film of the anode, the liquid spray including a salt of a second metal adapted to be decomposed at the predetermined elevated temperature under formation of an oxide of the second metal which is stable at the predetermined elevated temperature and possesses electrolytic properties, so as to form on the dielectric film a homogeneous layer consisting of the oxide of the second metal.

According to a preferred embodiment, the method of the present invention comprises the steps of heating an anode member consisting essentially of a film-forming metal and a dielectric oxide film thereon to an elevated temperature sufficiently high to cause decomposition of manganese nitrate and formation of manganese dioxide, and directing a finely subdivided liquid spray including manganese nitrate against the dielectric oxide film of the anode member so as to form thereon by decomposition of the manganese nitrate at the elevated temperature a homogeneous layer of manganese dioxide.

The present invention also comprises in a dry electrolytic capacitor, in combination, a formed aluminum anode sheet member, an annular layer of manganese dioxide adhering to a portion of the surface of the anode sheet member so that another portion of the surface of the anode sheet member remains exposed, an annular layer of electrically conductive material superposed upon the layer of manganese dioxide, and a pair of electric conductor means respectively connected to the annular layer of electrically conductive material and to the exposed portion of the surface of the anode sheet member.

It is also within the scope of the present invention to provide a dry electrolytic capacitor, comprising in combination, an elongated formed aluminum anode sheet member, a plurality of annular layers of manganese dioxide spaced from each other in longitudinal direction of the anode sheet member adhering to the latter so as to form between adjacent ones of the annular layers of manganese dioxide annular exposed portions of the anode sheet member, annular layers of electrically conductive material respectively superposed upon the layers of manganese dioxide, the elongated aluminum anode sheet member being bent at the annular exposed portions thereof so that superposed adjacent annular layers of electrically conductive material are superposed and in electric contact with each other, and a pair of electric conductor means respectively connected to at least one of the superposed and contacting annular layers of electrically conductive material, and to the elongated aluminum sheet member.

According to the present invention, the manganese nitrate or the like is sprayed in finely subdivided form onto the anode which has been preheated to the pyrolysis temperature of the manganese nitrate or the like, so that the same is continuously converted into a homogeneous layer of manganese dioxide. Since this conversion into the dioxide will take place during the entire spraying process at the free surface of the developing layer of manganese dioxide, vapors and gases which are formed at the pyrolysis temperature will escape immediately upon formation as the individual droplets of the manganese nitrate which are sprayed against the anode are converted into manganese dioxide, and without accumulation of excess liquid on the carrier metal. The manganese dioxide layer grows thereby within a few seconds to its desired thickness. The optimum thickness of the manganese dioxide layer can be changed or controlled by adjusting of the spray nozzles so as to change, as desired the size of the droplets and the density, or the proximity, of the droplets within the stream which is sprayed against the anode. Furthermore, the thickness of the manganese dioxide layer can also be controlled by repeated short-time interruptions of the spraying process.

It is a further advantage of the method according to the present invention that the configuration of the manganese dioxide layer produced on the formed anode can be controlled by means of stencils which are interposed into the path of the spray or stream directed against the anode. Thus, it is possible to form the manganese dioxide layer at predetermined portions of the surface of the anode carrier sheet while other portions of the surface of the anode carrier sheet remain exposed and will not be covered with manganese dioxide. This could not be achieved by following the above-described prior art methods except by applying to the portions of the anode which were to remain free of manganese dioxide protective covering layers firmly adhering to these anode portions and consisting of heat resistant material, i.e., of materials which will not be affected by the pyrolysis temperature.

The heating of the carrier metal, for instance a thin, formed aluminum foil which has been etched in order to increase the effective surface thereof, can be carried out by direct heat contact, electrically, or by heat radiation. Good results are achieved by heating the aluminum foil as well as supplying additional heat by radiation, whereby the foil is to be arranged so that it is exposed at all sides not only to the heat radiation but also to the spray of finely subdivided manganese nitrate or the like droplets, in order to form an annular, uniform and even manganese dioxide layer on the carrier band such as the formed etched aluminum foil.

In order to assure complete formation the formation of the anode is repeated once after the spraying of manganese nitrate or the like which is to be pyrolytically converted into manganese dioxide, and thereafter a metallic conductive counter electrode is applied to the free surface of the semiconductive manganese dioxide layer. Since, according to the present invention, a semiconductive electrolytic layer such as a manganese dioxide layer is formed which has a very smooth free or outer surface, it is possible to form a very thin metallic conductive contact layer thereon, for instance by vapor deposition of a suitable metal under a high vacuum, or by spraying metal at atmospheric pressure. Furthermore, it is possible to form the counter electrode, instead of a metal of graphite which may be applied in colloidal form to the free surface of the manganese dioxide layer, or of a combination of graphite and a metal layer, which is suitable as later described.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic cross sectional view of a capacitor in accordance with the present invention;

FIG. 2 schematically illustrates a plurality of individual capacitors arranged on a continuous anode carrier strip, however, omitting the terminals or conductive wires;

FIG. 3 illustrates an individual capacitor formed of one segment of the series of capacitors illustrated in FIG. 2;

FIG. 4 illustrates an incompletely folded capacitor formed of the capacitor strip shown in FIG. 2.

Figure 5A:
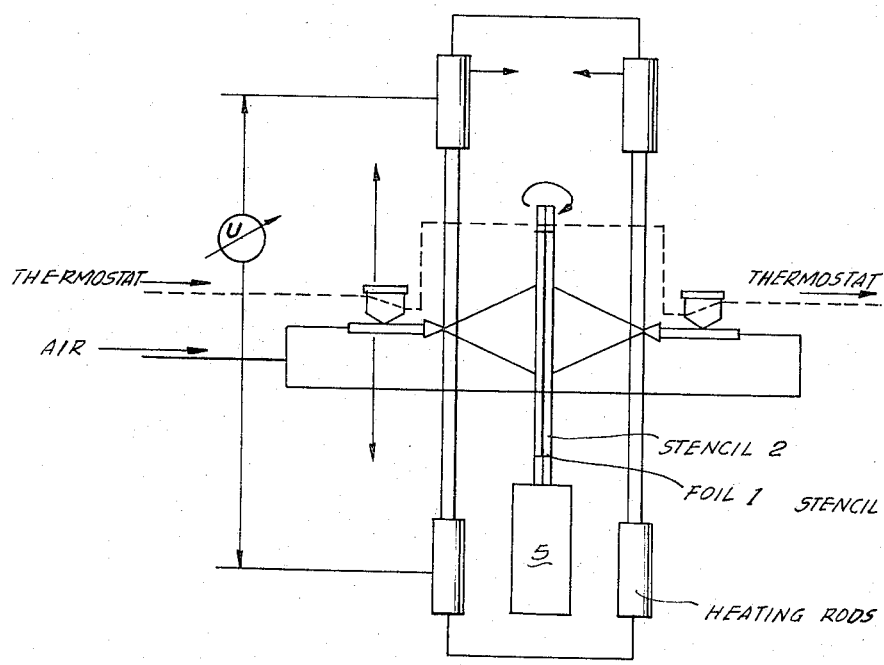
FIG. 5a–c is a diagrammatic illustration of an arrangement for producing the capacitor in accordance with the present invention.

The capacitor according to FIG. 1 comprises an aluminum foil 11 covered by an electrolytically produced aluminum oxide layer 12, a semiconductive manganese dioxide layer 13 and a counter electrode 14 which consists of a metal layer formed by vapor deposition. An aluminum connecting wire 15 has been welded to the anode prior to formation of the same, and the cathode connecting wire 16 is soldered to counter electrode 14.

The carrier strip shown in FIG. 2, which consists of a formed aluminum strip is covered at longitudinally spaced portions thereof with annular manganese dioxide layers 21 on which annular copper contact layers 22 are located as counter electrodes. The individual capacitor members or elements formed along the aluminum strip are spaced from each other by narrow portions 23 of the formed aluminum strip. The manganese dioxide or the like covering layers 21, as well as the superposed contacting metal layers 22 are of annular configuration and extend completely around the aluminum strip, including portions of the front and rear face thereof, as well as corresponding portions of the side edges.

Thus, each of the covered aluminum strip portions represents, per se, a capacitor with the respective portion of the formed aluminum strip as anode and conductive layer 22 as counter electrode.

The individual capacitors or capacitor members illustrated in FIG. 2 can be combined in various manners to form operative capacitors of different high degree of capacity, or the capacitor portions of FIG. 2 may be used individually.

According to FIG. 3, the capacitor is formed of a single covered portion of the aluminum strip of FIG. 2, and connecting wires are attached to aluminum anode 31 and to copper cathode 32. The entire capacitor is then enclosed in a manner known per se, in a protective covering 33 formed of a suitable synthetic resin. Several such individual capacitors may be superposed upon each other to form capacitor stack.

As illustrated in FIG. 4, a capacitor of high capacity can be formed of the structure illustrated in FIG. 2 by folding the formed aluminium strip at the unexposed portions 23. Folding in this manner is facilitated by the fact that the manganese dioxide covered portion of the aluminum strip are of greater stiffness than the exposed portions 23. The anode portions of the individual capacitor members of the folded strips wherein, as illustrated in FIG. 4, the bent exposed portions of the strip are indicated by reference numeral 41, are electrically interconnected by bent portions 41 of the aluminum carrier strip 42, and a connecting wire is welded to an exposed end portion of aluminum strip 42 (prior to formation of the anode, i.e., prior to forming the oxide layer thereon).

It will be readily understood that by further bending of the aluminum strip portions 41, adjacent cathode portions 43 will be placed in abutting position, in contact with each other. Furthermore the upper faces 43a may be connected by soldering. A cathode connecting wire 44 is then fixed to the front face of the outermost cathode layer 43, for instance by soldering. The complete capacitor according to FIG. 4, with folding are carried out to a somewhat greater extent so that adjacent faces of cathodes 43 are in an abutting position, is then covered in conventional manner wtih synthetic resin, or installed in a metal housing.

When it is desired, for instance, to produce a capacitor having a capacity of 10 μf and an operating voltage of 20 volts, and by using an etched aluminum foil having a thickness of 75 microns and a surface enlargement factor of about $OV=20$, four individual capacitor members of about the size of 1 x 1 cm. will be required, each of which has a capacity of 2.5 μf. The residual current of the individual capacitor members amounts to about 50 μa., and that of the completed capacitor to about 200 μa. After assembly, the capacitor is subjected for a period of several hours to a further formation step at between 25 and 30 volts. Thereby, the residual current will drop to about 15 μα. The loss angle of the capacitor at 50 Hz. amounts to about 5% and its apparent resistance at 10 kHz. to about 2 ohms.

While the present invention has been described mainly with respect to a formed aluminum anode in sheet or strip form and a manganese dioxide layer produced by pyrolysis of manganese nitrate, these specific metals and compounds, while constituting preferred embodiments of the present invention, are not to be considered as limiting features. Other film forming metals, particularly those on which an oxide layer can be formed may be used to replace the aluminum anode. Furthermore, the anode need not be in the shape of a strip or foil but may have any desired shape, for instance a cylindrical configuration.

Manganese dioxide is not the only semiconductive dry electrolyte of which the electrolytic layer on the formed anode may be produced. Other metal oxides which can be obtained by thermal decomposition of organic or inorganic salts of such metals at temperatures above 100° C., may also be used The salts which are to be sprayed onto the formed anode must either be soluble in suitable solvents, such as water, or of such low melting point that, in any event, liquid droplets consisting of or containing such organic or inorganic salts will be sprayed against the hot anode so as to be decomposed thereon under formation of the respective oxide. Metals which form such oxides include, in addition to manganese, also lead and nickel.

When it is desired to form a layer of manganese dioxide, $MnO_2$, it has been found particularly advantageous to use as the manganese salt which is to be sprayed against the hot anode either $Mn(NO_3)_2 \cdot 6H_2O$, or $$Mn(NO_3)_2 \cdot 4H_2O$$

which nitrates can be converted into manganese dioxide at temperatures of between about 200° and 400° C.

However, it is also possible to spray other manganese salts or solutions thereof, for instance organic manganese salts such as manganese acetate.

Preferably, the manganous nitrate will be molten in its own water or crystallization and thereby brought into a viscous, liquid condition in which it can be sprayed. A suitable temperature therefor is the range of between 60° and 70° C. However, it is also possible to utilize higher or lower temperatures, preferably within a range of between 30° C. and 100° C. It has been found advantageous to maintain the liquid which is to be sprayed and the entire spraying device at a constant temperature, for instance by means of a circulating temperature-controlling fluid.

It is, however, also possible to use an aqueous solution or, for instance, an alcoholic solution of the manganese nitrate or the like. Spraying such solutions will have the advantage that heating of the spraying device will not be required since the solution remains liquid at room temperature. Suitable solutions consist, for instance, of 74 parts by weight manganese nitrate and 26 parts by weight water, or of 76 parts by weight mangenese nitrate and 24 parts by weight methanol. The above percentage figures for the solvent are the minimum solvent proportions which are required in order to obtain a liquid which can be suitably sprayed at room temperature. However, it is not necessary to use such relatively small proportions of solvent and there is no upper limit of the solvent proportion, although it is generally not advisable to use more than about 30% by weight of solvent since otherwise too much energy, i.e., heat, must be supplied to the surface of the carrier anode for the purpose of evaporating the solvent.

It is an important feature of the present method of producing thin, dry semiconductive electrolytic layers on the surface of the formed anode, that no relatively large quantities of liquid will be formed or present at any time at the surface of the dielectric layer. It is accomplished thereby that the unfavorable side effects of the chemical or physical conversion of such major quantities of liquid, such as an attack of the dielectric layer, or bubble formation in the electrolytic layer will be avoided.

In order to achieve this, i.e., in order to prevent the accumulation of liquid on the hot anode surface, it is desirable to control the amount of manganese nitrate as well as the amount of heat energy which are supplied per unit of surface area of the anode and per unit of time. The relationship between the supply of manganese nitrate and the heat available for decomposition of the same, and also possibly for evaporation of solvent, is best characterized by the temperature of the surface against which the manganese nitrate or the like is sprayed. This relationship preferably is so chosen that the temperature of the surface does not exceed 450° C. since otherwise, with further increasing temperatures, decomposition of the manganese dioxide will take place at a progressively increasing rate and will reduce the amount of manganese dioxide which remains available to act as an oxygen donor. The lower limit of the temperature of the hot surface against which the manganese nitrate or the like is sprayed may be at 200° C. or even below, since even at somewhat lower temperatures than 200° C. the solvent will immediately evaporate and thus no accumulation of liquid will take place. However, at such lower temperatures, the conversion of the manganese nitrate or the like into manganese dioxide, which is to take place after evaporation of the solvent, will proceed at a lower pace. Furthermore, at such lower temperature, very loose manganese dioxide layers of low adhesive strength will be formed. Thus, the optimum temperature range for producing the manganese dioxide layer will be a surface temperature of the anode of between 300° and 400° C. Manganese layers which adhere firmly and which show very good self healing properties may be formed, for instance, at 380° C.

The ratio between the amount of manganese nitrate which is sprayed against the anode and the amount of heat supplied to the anode can be adjusted by increasing or reducing the heat supply while keeping the amount of manganese nitrate which is sprayed per unit of time and anode surface area constant, until the desired conditions are achieved. Another possibility of adjusting the ratio between manganese nitrate supply and heat supply can be found in varying the number and size of the manganese nitrate droplets which contact the anode surface per unit of time and square area. The number of droplets which reach the hot anode surface per unit of time and surface area is also described as droplet density. The droplet density multiplied by the size of the droplets will give the total amount of manganese nitrate which contacts the anode surface per unit of time and surface area. Droplet density and size can be easily controlled by suitably choosing the diameter of the spray nozzle orifices and the amount of carrier gas.

Furthermore, it is also possible by maintaining the supply of heat energy and the supply of manganese nitrate constant, to interrupt the spraying process for short periods of time, for instance by means of an intercepting device such as a rotating baffle or by suitable movement of the spray gun. This method is particularly simple and convenient from a technical point of view, especially combined with radiation heating of the anode surface, since less heat energy may be conveyed to the anode surface than would be required for maintenance of a constant surface temperature. In this case, the temperature of the surface varies between an upper limit which is reached shortly before spraying is resumed, and drops during the spraying to a lower limit which is reached at about the time spraying is interrupted. Thereby, the anode body serves as a heat storage device which by the heat radiation applied thereto during interruption of the spraying process is recharged. The upper and the lower temperature limit should be within the suitable temperature range of between 200° and 450° C., for instance at 380° C. for the upper and 350° C. for the lower temperature limit.

The spraying process is repeated or continued for as long as necessary to form a semiconductive, dry electrolyte layer of the desired thickness. If the amount of manganese nitrate or the like which is sprayed onto the hot anode per unit of time and surface area remains constant, then the number of successive spraying steps or the total length of the spraying period will be a measure for the thickness of the thus produced layer of manganese dioxide.

As pointed out further above, the maximum temperature of the anode body such as a formed aluminum foil which is contacted by the manganese nitrate or the like, preferably will not exceed 450° C., since at higher temperatures to an increasing extent other oxides such as $Mn_2O_3$ and $Mn_3O_4$ will be formed and will reduce the effectiveness of the manganese dioxide layer as an oxygen donor.

The temperature of the manganese nitrate or the like, or of the solution thereof which is sprayed against the anode surface must be such as to permit formation of liquid droplets which can be sprayed. Thus, if the manganese nitrate or the like is dissolved in a suitable solvent, the lower practical limit of the suitable temperature for spraying of the solution will be room temperature.

Prior to spraying the manganese nitrate or the like against the hot anode surface, it is necessary that the dielectric layer is formed thereon, for instance by anodic oxidation of an etched aluminum foil so as to form a film of $Al_2O_3$ thereon. Reforming, i.e., repeated forming after a layer of manganese dioxide has been produced on the anode, serves only to improve weak portions of the oxide layer but not to produce an entire oxide layer of the required thickness and quality, i.e., continuity.

The forming of the anode generally is carried out by producing by anodic oxidation a dielectric oxide layer thereon. The forming of the carrier metal or anode, for instance of an aluminum foil can be carried out in conventional manner. However, since the dry electrolyte with respect to self healing properties does not fully correspond to those of a wet electrolyte, it is preferred to carry out the forming of the anode in such a manner that the thus produced oxide layer is particularly suitable for use in a capacitor in combination with a dry electrolyte.

A method of forming the anode according to which aluminum oxide layers are produced which possess good dielectric characteristics and do not lose the same during production of the semiconductive manganese dioxide electrolyte layer in accordance with the present invention thereon, may be carried out in the following manner: a saturated aqueous solution of ammonium pentaborate is used as electrolyte.

To produce, for instance, a 60 v.-oxide layer, the anode body is formed at room temperature at a forming voltage of 60 volts for 15 minutes. In order to eliminate weak portions of the thus formed oxide layer, the anode is then immersed for 20 seconds into boiling water and thereafter again formed at room temperature at a forming voltage of 60 volts for 30 minutes. To the extent to which water is required for the electrolyte de-ionized water is used. Determined in a wet electrolyte, the thus-formed oxide layer will have a loss factor of between 1 and 2% and a residual current of between 1 and 2 $\mu a./\mu f.$ at a test voltage of 20 volts, which corresponds to the operating voltage subsequently applied to the dry electrolytic capacitor.

Figure 5B:
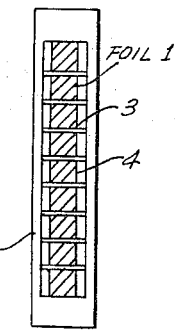
Figure 5C:
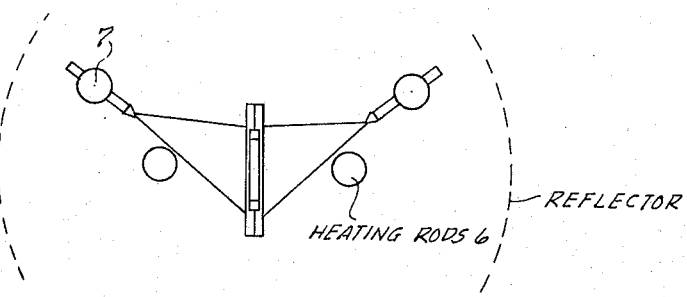

An example of a device or arrangement for carrying out the process of the present invention will now be described with reference to FIG. 5 of the drawing, without, however, limiting the invention to the specific details of the example.

An etched aluminum foil 1 having a thickness of 75 microns which has been formed at a voltage of 60 volts, is inserted between and fixed to the two halves of a stencil 2 which has been preheated to about 400° C. Stencil 2 separates foil surface portions of 1 cm.² by strips having a width of 2.5 mm. The windows of the stencil have a width of 25 mm. and the foils a width of 10 mm., so that the edges 4 of the foil are freely accessible. The stencil is fixed to a turntable 5 and moved between two heating rods 6, consisting for instance of Silit. The heating rods are located at a distance of about 8 cm. from foil 1 and are heated, by passage of current therethrough, to a temperature sufficiently high so that by radiation of heat from the heating rods the foil will reach a temperature of about 400° C. A spray gun 7 is located at each side of the foil in such a manner that the spray emanating from the respective spray gun will form with the surface of the foil an angle of 45°. The spray guns are inclined in such a manner that the two opposite surfaces of the foil as well as one of the edges therebetween will be contacted by the spray or stream emanating from the spray guns. The spray guns, the liquid to be sprayed and the carrier gas are heated to 70° C. by means of a circulating heating fluid of constant temperature. The nozzle diameters of the spray guns equal 0.5 mm. of the quantity of liquid which is sprayed from the spray guns will be about 2 cm.³/min. in about 12 liters of air or other carrier gas per minute.

The spray guns are now moved in a reciprocating manner beyond the end of the stencil and back again, preferably by means of a compressed air drive. After each stroke of the spray guns, the stencil is turned by 180° so that both edges as well as both surfaces of the exposed anode portions will be evenly covered with a manganese dioxide layer. Under these conditions about 15 strokes or reciprocating movements of the spray guns will be required to produce manganese dioxide layer having a thickness of about 20 microns.

The foil temperature varies at different times and portions thereof between 350° and 380° C.

It is also possible to carry out the above-described process as a continuous process, by passing between the spray guns a continuous anode strip located between two stencils in which case a total of four spray guns is preferably used in order to evenly cover the exposed portions of both faces of the aluminum foil or the like, as well as the edges thereof. The above described turning of the stencil with the anode therebetween is dispensed with.

The aluminum foil may be of any desired thickness. Semiconductive layers may be produced according to the present invention not only on foil-shaped anodes but on anodes of any desired configuration, including those of relatively large cross-sectional dimensions. However, the minimum thickness of the aluminum foil is determined by mechanical strength requirements, ability to be welded, etc. Preferably, the thickness of the aluminum foil will not be below 50 microns, and very good results are achieved with aluminum or the like anode foils having a thickness of between 75 and 200 microns.

The manganese dioxide layer preferably will have a minimum thickness of 5 microns and a maximum thickness of 50 microns, although it is also possible to produce, in accordance with the present invention, manganese dioxide layers of greater thickness. Very good results are achieved with manganese dioxide layers having a thickness of about 20 microns.

The thickness of the counter electrode which is applied to the free surface of the manganese dioxide layer or the like, will depend on the material thereof. A graphite counter electrode preferably will consist of a graphite layer having a thickness of between 5 and 20 microns and the thickness of a copper layer which may be applied thereto may be about between 1 and 5 microns. A counter electrode of colloidal silver preferably will have a thickness of between 5 and 20 microns.

The counter electrode may be formed, for instance, of zinc, copper, nickel or silver, as well as of graphite. Zinc may be sprayed onto the manganese dioxide layer or on an intermediate graphite layer in accordance with the method of Schoop. Silver may be brushed on in colloidal form or may be sprayed onto the electrolytic layer.

Due to the great smoothness of the outer face of the manganese dioxide layer produced according to the present invention, it is also possible to form the counter electrode by vapor deposition of a metal layer under a high degree of vacuum. Copper is particularly suitable for this purpose, because the anode connecting wire can be easily soldered onto the copper layer. For reasons of corrosion resistance and firmness of adherence, it is preferred to interpose an intermediate layer of graphite between the manganese dioxide layer and the copper layer formed by vapor deposition.

Such graphite layer is desirable primarily in order to protect corrosion-sensitive metal counter electrodes. In principle, a graphite layer per se will suffice as counter electrode, however the electric characteristics of a capacitor having a graphite counter electrode are not as good as those of a capacitor having a metallic counter electrode, due to the high resistance caused by the graphite layer and the adhesive required for adhering a connecting wire to the anode.

Graphite preferably is applied in colloidal form whereby water or alcohol may be used as carrier liquid. The colloidal graphite suspension is brushed on with a small brush or may be sprayed on. During application of the graphite layer, the temperature of the substrate, i.e., the manganese dioxide layer may vary between room temperature and about 300° C. However, the electric characteristics of the graphite layer are better if the temperature of the substrate during application of the graphite layer does not exceed 90° C.

According to the process of the present invention, the dielectric layer is exposed to chemical and thermal treatment only for a short period of time and in a relatively protective manner and thus formation and pyrolysis need not be repeated. However, a second formation after the pyrolytic production of the manganese dioxide or the like layer is frequently advisable in order to assure complete formation and coverage of the aluminum anode with the oxide layer.

Such second formation may be carried out in saturated ammonium pentaborate solution for about 10 minutes at a voltage equal to about ⅔ of the voltage used at the initial formation. Thereafter, the foil is rinsed in deionized water and dried. This is followed by application of the conductive counter electrode layer.

Pure oxygen may be used in place of air as the carrier gas for the spraying of the manganese nitrate or the like. It can be assumed that the use of pure oxygen gas will facilitate the reaction, i.e., the formation of manganese dioxide, and that the excess oxygen will also affect the specific composition of the $MnO_2$ layer so as to have a favorable effect on the self healing properties of the $MnO_2$ layer.

Spraying with the help of a carrier gas may also be replaced by pressure spraying in a manner known per se, whereby preferably pressures of more than 30 atmospheres and up to 200 atmospheres are utilized. Pressure spraying in the absence of a carrier gas has the advantage that the cooling caused by the carrier gas will be eliminated.

The method of the present invention permits to produce within a very short period of time, such as within a few seconds, a dense, homogeneous manganese dioxide layer at the surface of the dielectric film on the anode. The structural characteristics of these layers are thus that it is no longer necessary to repeat the pyrolytic formation of manganese dioxide in order to fill cavities or porous portions. In contrast thereto, the conventional processes, as described, require repeated immersion and drying processes and repeated pyrolytic formation of manganese dioxide.

Due to the great speed of the thermal decomposition of the manganese salt or the like to the respective oxide and, furthermore, due to the fact that the reaction proceeds practically only at the surface of the growing manganese dioxide layer, the dielectric underlying layer is exposed only to very little chemical and thermal stress. In contrast thereto, according to the conventional methods described further above, the time required for the thermal decomposition of the manganese salt is much longer and thus also the possible deleterious effect thereof on the underlying anodic oxidation layer.

In addition, the method of the present invention permits in a simple manner to control exactly the amount of manganese nitrate or the like which is applied to the formed anode, and thus the desired thickness of the manganese dioxide layer can be maintained within very close tolerances.

The manganese dioxide layer formed according to the present invention has a very smooth surface so that relatively very thin graphite or metal layers may be applied thereto as counter electrodes.

It is possible, according to the present invention, to produce, for instance on an aluminum foil, sharply defined areas of the manganese dioxide or the like layer. Since liquid will not accumulate at the surface of the anode, it is possible to cover portions thereof by means of simple stencils which expose only the portions of the surface of the anode on which the manganese dioxide or the like layer is to be formed. The prior art methods discussed further above, permit the covering of portions of the anode surface which should remain free of the manganese dioxide layer only by means of firmly adhering heat resistant materials which are difficult or impossible to remove after the manganese dioxide or the like layer has been formed at the exposed portions of the anode surface.

It is also possible, as described further above, to carry out the method of the present invention in a continuous manner, namely so that a continuous strip, for instance an aluminum foil is first formed and subsequently, while partially covered by stencils, spaced semiconductive layers such as manganese dioxide layers are formed thereon.

The capacitors according to the present invention do not require spacing members of heat resistant and chemically resistant material between the opposite electrodes.

The capacitors according to the present invention possess a very high capacity per unit of volume due to the fact that the thickness of the semiconductive electrolytic layers as well as the thickness of the counter electrodes applied to the surface of the semiconductive electrolytic layer can be very small due to the homogeneity and high degree of surface smoothness of the semiconductive electrolytic layers.

In accordance with the present invention capacitors of rectangular shape may be produced. For instance, when using a formed aluminum foil at the anode, the dimensions of a $2\mu f$. capacitor for an operating voltage of 20 volts, embedded in a mass of synthetic resin will be only 14 x 14 x 2.5 mm.

Since the thickness of the electrolytic layer is not determined by production requirements but can be freely chosen in accordance with the electric requirements of the capacitor, the capacitors produced according to the present invention will have very low series resistance and, consequently, optimum electrical characteristics. This is expressed particularly in the frequency dependency of the apparent resistance or impedance and in the loss factor.

It will be understood that each of the elements described above, or two or more together, may also find a useful application in other types of capacitors differing from the types described above.

While the invention has been illustrated and described as embodied in a dry electrolytic capacitor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method for producing a dry electrolytic capacitor having an anode of film-forming metal including a dielectric oxide film thereon and a pyrolytically reducible oxide layer on the film, the steps comprising heating said anode and dielectric film to a temperature within the range of 100–450° C., and spray depositing, on the thus heated dielectric film, a finely divided liquid solution of a metal salt pyrolytically decomposable, at the temperature of said heating, to a pyrolytically reducible oxide for in situ producing a homogeneous electrolyte-reducible oxide layer on said dielectric film.

2. A method as defined in claim 1, wherein said film-forming metal is selected from the group consisting of tantalum, aluminum, magnesium, titanium, niobium, zirconium and zinc.

3. A method as defined in claim 1, wherein said spray depositing is carried out by directing against said heated dielectric film under pressure a stream of finely subdivided droplets of a solution in a liquid of a pyrolytically decomposable metal salt distributed in a carrier guard.

4. A method as defined in claim 1, wherein said finely divided liquid solution is spray deposited at an elevated temperature below the decomposition temperature of said pyrolytically decomposable metal salt and below the temperature of said heated anode and dielectric film.

5. A method as defined in claim 1 and including the step of applying to a conductive layer the free face of the thus produced homogeneous electrolyte-reducible oxide layer.

6. A method as defined in claim 5, wherein said conductive layer is a metal layer.

7. A method as defined in claim 1, and including the step of spraying colloidal graphite onto the still hot free face of the thus produced homogeneous electrolyte-reducible oxide layer so as to form thereon a conductive graphite layer.

8. A method as defined in claim 7, and including the step of applying a conductive metal layer to the free face of said graphite layer.

9. A method as defined in claim 1, wherein said pyrolytically decomposable metal salt is manganese nitrate.

10. A method as defined in claim 9, wherein said film-forming metal is aluminum.

11. A method as defined in claim 1, wherein said film-forming metal is strip-shaped and said spray depositing is carried out onto a plurality of annular surface portions of the heated dielectric strip which surface portions are spaced from each other in longitudinal direction of said strip.

12. A method as defined in claim 11, wherein said film-forming metal is an etched aluminum strip and said pyrolytically decomposable metal salt is manganese nitrate.

13. A dry electrolytic capacitor comprising a sheet of film-forming metal having a terminal portion and an anode portion, an annular dielectric oxide film formed on the surface of and extending around the anode portion, an annular metal dioxide electrolyte layer on the dielectric film around the anode portion, said metal dioxide layer being the in situ formed product of a finely divided liquid solution of a pyrolytically decomposable metal salt spray deposited on said dielectric film with said anode being simultaneously heated to a temperature within the range of 100–450° C. for progressively converting the depositing metal salt into said metal dioxide product layer, and an annular layer of electrically conductive material on the exposed surface of said metal dioxide layer.

14. An elongated dry electrolytic capacitor as defined in claim 13, wherein the annular metal dioxide electrolyte layer is located only on longitudinally spaced portions of said annular dielectric oxide film, leaving intervening annular portions of said dielectric oxide film exposed, said capacitor being bent at said annular exposed portion thereof so that adjacent annular metal dioxide layers are superposed and in electric contact with each other; and a pair of electric conductor means respectively connected to at least one of said superposed contacting annular layers of metal dioxide and to said sheet of film-forming metal.

15. A dry electrolytic capacitor as defined in claim 13, wherein said metal dioxide electrolyte layer consists essentially of manganese dioxide and said film-forming metal is aluminum.

16. A dry electrolytic capacitor comprising a plurality of dry electrolytic capacitors as defined in claim 15 arranged in superposed relationship, the annular layers of manganese dioxide adhering to portions only of the anodes, respectively, leaving other portions of said anodes exposed and wherein superposed manganese dioxide layers are in contact with each other, said dry electrolytic capacitor including electric connecting means for connecting the exposed portions of said anodes, respectively; and a pair of electric conductor means, respectively connected to said contacting manganese dioxide layers and said connected exposed portion of said anodes.

17. An elongated dry electrolytic capacitor as defined in claim 15, wherein the annular manganese dioxide electrolyte layer is located only on longitudinally spaced portions of said annular dielectric oxide film, leaving intervening annular portions of said dielectric oxide film exposed, said capacitor being bent at said annular exposed portion thereof so that adjacent annular layers of manganese dioxide are superposed and in electric contact with each other; and a pair of electric conductor means respectively connected to at least one of said superposed contacting annular layers of manganese dioxide and to said aluminum sheet.

References Cited
UNITED STATES PATENTS

| | | |
|---|---|---|
| 3,127,660 | 4/1964 | Gerondeau. |
| 3,123,894 | 3/1964 | Von Bonin. |
| 3,054,029 | 9/1962 | Wagner et al. _____ 317—230 |

JAMES D. KALLAM, *Primary Examiner.*